(12) United States Patent
Tao et al.

(10) Patent No.: US 11,288,024 B2
(45) Date of Patent: Mar. 29, 2022

(54) IMAGE FORMING APPARATUS

(71) Applicant: KYOCERA Document Solutions Inc., Osaka (JP)

(72) Inventors: Kozo Tao, Osaka (JP); Daiki Sone, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/413,103

(22) PCT Filed: Nov. 12, 2019

(86) PCT No.: PCT/JP2019/044351
§ 371 (c)(1),
(2) Date: Jun. 11, 2021

(87) PCT Pub. No.: WO2020/129469
PCT Pub. Date: Jun. 25, 2020

(65) Prior Publication Data
US 2022/0027099 A1    Jan. 27, 2022

(30) Foreign Application Priority Data
Dec. 21, 2018 (JP) .............................. JP2018-239360

(51) Int. Cl.
*G06F 3/12* (2006.01)
*H04N 1/00* (2006.01)

(52) U.S. Cl.
CPC ............ *G06F 3/125* (2013.01); *G06F 3/1205* (2013.01); *G06F 3/1253* (2013.01); *H04N 1/00694* (2013.01); *H04N 1/00708* (2013.01); *H04N 1/00779* (2013.01)

(58) Field of Classification Search
CPC ...... G06F 3/125; G06F 3/1205; G06F 3/1253; H04N 1/00694; H04N 1/00708; H04N 1/00779
See application file for complete search history.

(56) References Cited

U.S. PATENT DOCUMENTS

| | | | |
|---|---|---|---|
| 7,649,642 B2 | 1/2010 | Bos et al. | |
| 2006/0012807 A1 | 1/2006 | Bos et al. | |
| 2008/0232835 A1* | 9/2008 | Ota | G03G 15/5087 |
| | | | 399/45 |

(Continued)

FOREIGN PATENT DOCUMENTS

| | | |
|---|---|---|
| JP | 2006-031704 A | 2/2006 |
| JP | 2016-224697 A | 12/2016 |
| JP | 2017-098599 A | 6/2017 |

*Primary Examiner* — Iriana Cruz
(74) *Attorney, Agent, or Firm* — Studebaker & Brackett PC

(57) ABSTRACT

An image forming apparatus (1) includes an image forming section (6), a plurality of recording paper trays (7a to 7n), storage (5), and a paper feed stage selecting section (12). The image forming section (6) performs advanced printing based on a paper profile. The paper feed stage selecting section (12) selects a recording paper tray (7) from the recording paper trays (7a to 7n) from which recording paper is to be fed to the image forming section (6) based on a printing instruction. When a specific paper profile is not associated with the selected recording paper tray (7), the paper feed stage selecting section (12) notifies the image forming section (6) of a manual setting and causes the image forming section (6) to perform simple printing.

10 Claims, 6 Drawing Sheets

(56) References Cited

U.S. PATENT DOCUMENTS

| | | | | |
|---|---|---|---|---|
| 2010/0221460 A1* | 9/2010 | Wexler | ................ | B41M 5/5218 |
| | | | | 428/32.1 |
| 2013/0003088 A1* | 1/2013 | Feng | .................... | G06F 3/1253 |
| | | | | 358/1.9 |
| 2016/0162765 A1* | 6/2016 | Konuma | ............ | H04N 1/00623 |
| | | | | 358/1.15 |
| 2019/0018631 A1* | 1/2019 | Shinohara | ............. | G06F 3/1252 |

* cited by examiner

| Recording paper tray 7a | Paper profile A |
| --- | --- |
| Recording paper tray 7b | Manual setting: A4, normal paper, 90 gsm, white, etc |
| Recording paper tray 7c | Paper profile B |

| Recording paper tray 7n | Paper profile C |
| --- | --- |

FIG. 2

IMAGE FORMING APPARATUS

TECHNICAL FIELD

The present invention relates to an image forming apparatus for production printing.

BACKGROUND ART

In production printing, recording paper that is representative of what is widely distributed in the market is evaluated and a list database of paper profiles is offered as a paper catalog. Attribute value groups of the recording paper that are necessary for printing are collected in the paper profiles (for example, refer to Patent Literature 1 and 2). Therefore, a user can perform advanced printing in which printing conditions are optimized for recording paper to be used based on a paper profile of the recording paper by only selecting the recording paper from the paper catalog at the time of a printing operation.

CITATION LIST

Patent Literature

[Patent Literature 1]
Japanese Patent Application Laid-Open Publication No. 2006-31704
[Patent Literature 2]
Japanese Patent Application Laid-Open Publication No. 2016-224697

SUMMARY OF INVENTION

Technical Problem

However, the production printing industry is progressing towards smaller lots of multiple products, and there is demand for intra-company centralized printing (CRD: Central Reprographics Department) referred to as light production. Furthermore, demand for various types of printing in print shops is greater than ever. As such, there is a need for an environment in which both advanced printing based on paper profiles and simple printing for offices are enabled. Even so, because of greatly differing user interfaces, it is difficult to provide an environment in which both advanced printing based on paper profiles and simple printing for offices are enabled.

The present invention takes the above problem into account, and aims to provide an image forming apparatus capable of both advanced printing based on paper profiles used for production printing and simple printing for offices.

Solution to Problem

An image forming apparatus according to the present invention performs advanced printing in which printing conditions are optimized for recording paper based on a paper profile in which an attribute value group of the recording paper necessary for printing is collected. The image forming apparatus includes an image forming section, a plurality of recording paper trays, storage, and a paper feed stage selecting section. The image forming section performs the advanced printing based on the paper profile. Each of the recording paper trays houses recording paper to be fed to the image forming section. The storage stores therein paper feed stage setting information in which either a specific paper profile or a manual setting as an attribute value group manually set by a user is associated with each of the recording paper trays. The paper feed stage selecting section selects a recording paper tray from the recording paper trays from which the recording paper is to be fed to the image forming section based on a printing instruction. By referring to the paper feed stage setting information, the paper feed stage selecting section notifies the image forming section of the specific paper profile associated with the selected recording paper tray and causes the image forming section to perform the advanced printing. When the specific paper profile is not associated with the selected recording paper tray, the paper feed stage selecting section notifies the image forming section of the manual setting and causes the image forming section to perform simple printing.

Advantageous Effects of Invention

According to the present invention, simple printing with a manual setting by a user can be performed when a paper profile is not associated with a selected recording paper tray 7. Accordingly, an effect is achieved in which both advanced printing based on paper profiles generally used in production printing and simple printing for offices are enabled.

BRIEF DESCRIPTION OF DRAWINGS

FIG. 2 is a diagram illustrating an example of paper feed stage setting information illustrated in FIG. 1.

DESCRIPTION OF EMBODIMENTS

The following specifically describes an embodiment of the present invention with reference to the accompanying drawings.

Figure 1:
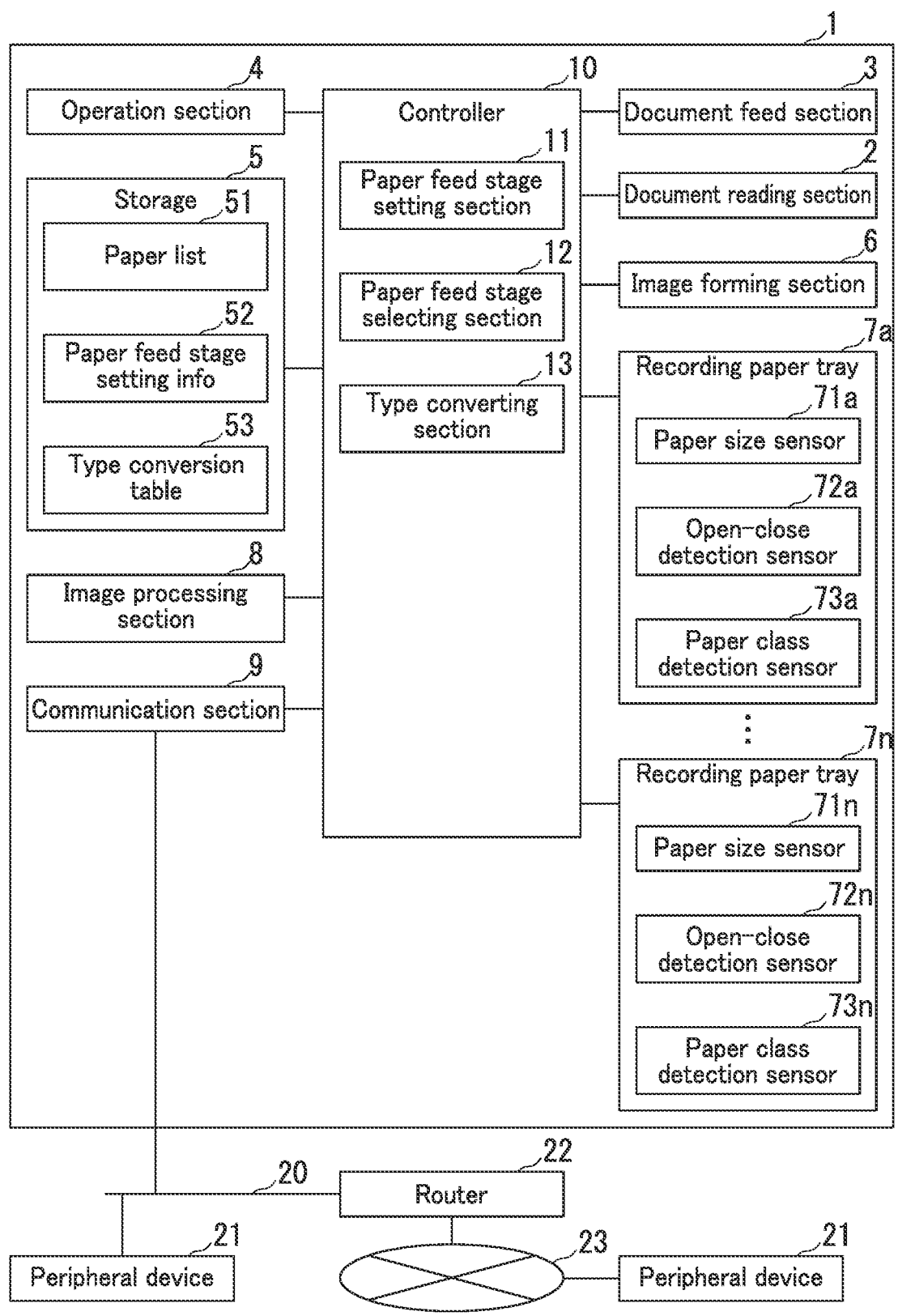
FIG. 1 is a block diagram illustrating a general configuration of an image forming apparatus according to an embodiment of the present invention.

An image forming apparatus 1 of the present embodiment is a multifunction peripheral, a multifunction printer, or a multifunction product (MFP). As illustrated in FIG. 1, the image forming apparatus 1 includes a document reading section 2, a document feed section 3, an operation section 4, storage 5, an image forming section 6, recording paper trays 7a to 7n, an image processing section 8, a communication section 9, and a controller 10.

The document reading section 2 is a reading unit which radiates light to a document and reads a document image by receiving the reflected light and the like. The document reading section 2 includes contact glass on which the document is placed and slit glass provided on a conveyance path of the document feed section 3.

The document feed section 3 picks up the document placed on a document placement surface thereof a sheet at a time and feeds the document to the document reading section 2. The document feed section 3 and the document reading section 2 are pivotally connected to each other by a hinge mechanism inside the image forming apparatus 1. The document feed section 3 functions as a pivotable document table cover provided opposite to the contact glass. By opening the document feed section 3 upward, the upper surface of the contact glass is opened to allow the document to be set on the contact glass.

The operation section 4 is provided with various operation buttons and a display section such as a liquid-crystal display. Through a user inputting operation to any of the operation buttons of the operation section 4, various settings of the image forming apparatus 1 are made and various functions such as image formation are performed. The display section displays the state of the image forming apparatus 1 and displays an image formation condition and printing number. The display section is a touch panel which performs various settings according to instructions of the user, such as magnification setting, density setting, and functions like duplex printing and black and white inversion.

The storage 5 is a means of storage such as semiconductor memory or a hard disk drive (HDD) which stores therein various image data such as image data acquired by the document reading section 2 reading a document. A paper list 51, paper feed stage setting information 52, and a type conversion table 53 are also stored in the storage 5.

The paper list 51 is a paper catalog generally used in production printing, in which a paper profile is registered for each type of recording paper. Attribute values for each type of recording paper necessary for printing are collected into an attribute value group as a paper profile. The paper profiles include information about the recording paper such as names, paper sizes, paper types, basis weights, colors, and presence or absence of holes.

As illustrated in FIG. 2, the paper feed stage setting information 52 is information in which the recording paper trays 7a to 7n that are paper feed stages are associated with the paper profiles of the recording paper housed in a corresponding one of the recording paper trays 7a to 7n. Note that it is possible for the user to manually associate settings (referred to as manual setting in the following) of an attribute value group to each paper feed stage in the paper feed stage setting information 52. Additionally, either a paper profile or a manual setting can be associated with each paper feed stage in the paper feed stage setting information 52. Accordingly, a paper feed stage (recording paper tray 7b) that is not associated with a paper profile is associated with a manual setting. In other words, a manual setting is valid only when a paper profile is not associated with a paper feed stage. When a paper profile is associated with a paper feed stage, the image forming section 6 performs advanced printing based on the paper profile. When a manual setting is associated with a paper feed stage, the image forming section 6 performs simple printing based on the manual setting.

The type conversion table 53 is a table for converting a paper profile used in advanced printing into a paper type for simple printing. That is, a paper type is included in each paper profile but does not match the paper type for simple printing. Therefore, the type conversion table 53 provides information for specifying a paper type for simple printing that most resembles a paper profile based on the paper size, the paper type, the basis weight, the color, and the presence or absence of holes included in the paper profile.

The image forming section 6 includes a photosensitive drum, a charger, a light exposure section, a developing section, a transfer section, a cleaning section, and a fixing section. The image forming section 6 records a formed image to the recording paper.

By receiving a notification of a paper profile, the image forming section 6 performs advanced printing in which printing conditions are optimized for the recording paper corresponding to the paper profile based on an attribute value group of the paper profile. By receiving a notification of a manual setting, the image forming section 6 also performs simple printing under prescribed printing conditions based on the attribute value group of the manual setting. Note that the printing conditions are used for setting printing speed or each process for image formation.

Each recording paper tray 7 is a paper feed stage in which recording paper to be fed to the image forming section 6 is housed. In the present embodiment, n paper feed stages are provided for the recording paper trays 7a to 7n.

Paper size sensors 711 to 71n are respectively provided in the recording paper trays 7a to 7n. The paper size sensors 71a to 71n detect the paper size of the recording paper housed in a corresponding one of the recording paper trays 7a to 7n. The paper size sensors 711 to 71n detect the paper size of the recording paper based on for example intervals of paper guides provided for the corresponding tray. Note that paper size sensor 71 is a general term for the paper size sensors 71a to 71n.

Open-close detection sensors 72a to 72n are respectively provided in the recording paper trays 7a to 7n. The open-close detection sensors 72a to 72n are provided inside unillustrated removable cassettes and detect opening and closing operation of the trays. Replenishment or replacement of the recording paper in the recording paper trays 7a to 7n involves opening and closing operation of the trays. Accordingly, the open-close detection sensors 72a to 72n respectively detect access to the recording paper housed in the recording paper trays 7a to 7n. Note that open-close detection sensor 72 is a general term for the open-close detection sensors 72a to 72n.

Paper class detection sensors 73a to 73n are respectively provided in the recording paper trays 7a to 7n. The paper class detection sensors 73a to 73n for example use reflective optical sensors and each detect defuse reflectivity to detect a paper class of the recording paper such as paper type, color, and presence or absence of holes. Note that paper class detection sensor 73 is a general term for the paper class detection sensors 73a to 73n.

The image processing section 8 is an arithmetic processing circuit such as a microcomputer including elements such as a central processing unit (CPU), read-only memory (ROM), and random-access memory (RAM). The image processing section 8 for example performs various jobs in image processing such as zooming processing, density adjustment processing, and gradation adjustment processing.

The communication section 9 has a data communication function which sends and receives various data to and from a peripheral device 21 such as a personal computer through a network 20 such as a local area network (LAN). The communication section 9 is also configured to be capable of communication with the Internet 23 through the network 20 and a router 22. As such, the communication section 9 has a function of sending and receiving various data to and from various communication devices connected to the Internet 23.

The controller 10 is an information processing section such as a microcomputer including elements such as a CPU, ROM, and RAM. A control program for performing operation control of the image forming apparatus 1 is stored in the ROM. The controller 10 reads out the control program stored in the ROM and performs overall apparatus control by loading the control program in the RAM.

The controller 10 functions as a paper feed stage setting section 11, a paper feed stage selecting section 12, and a type converting section 13.

The paper feed stage setting section 11 receives the paper profiles associated with the recording paper trays 7a to 7n through the operation section 4 or the communication section 9 and sets them to the paper feed stage setting information 52. When any of the paper size sensors 71a to 71n detects opening or closing of a corresponding cassette, the paper feed stage setting section 11 performs a conformity confirmation operation to confirm conformity of the paper profiles associated with a corresponding one of the recording paper trays 7a to 7n to the recording paper housed in the corresponding recording paper tray 7a to 7n.

Upon receiving a printing instruction in which no paper feed stage is specified, the paper feed stage selecting section 12 performs a paper feed selection operation to select a paper feed stage in which recording paper corresponding to a setting value included in the print job of the printing instruction is housed.

The type converting section 13 converts the paper profiles associated with the recording paper trays 7a to 7n into paper types for simple printing based on the type conversion table 53.

Figure 3A:
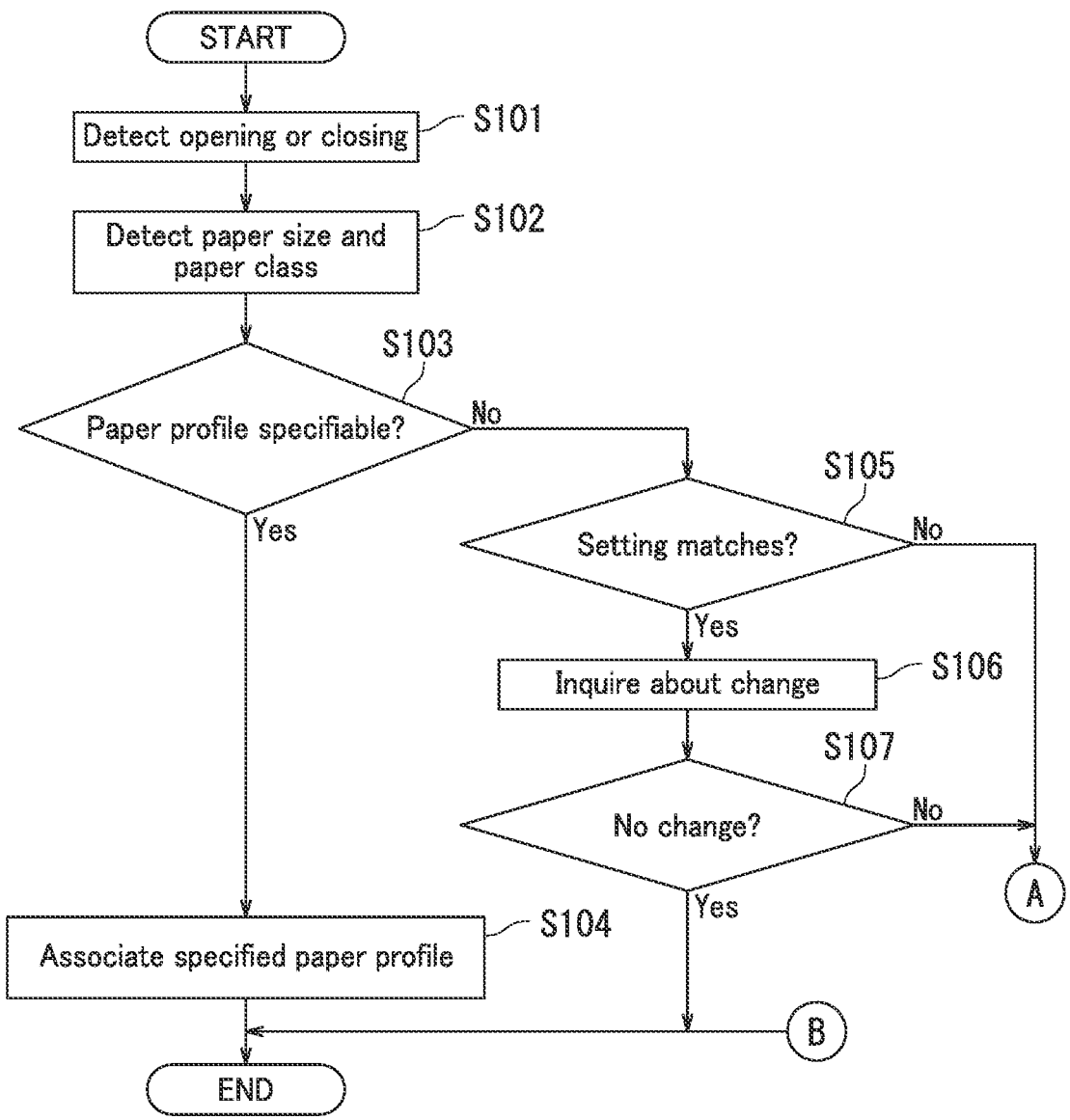
FIG. 3A is a first stage flowchart depicting a conformity confirmation operation of the image forming apparatus according to the embodiment of the present invention.
Figure 3B:
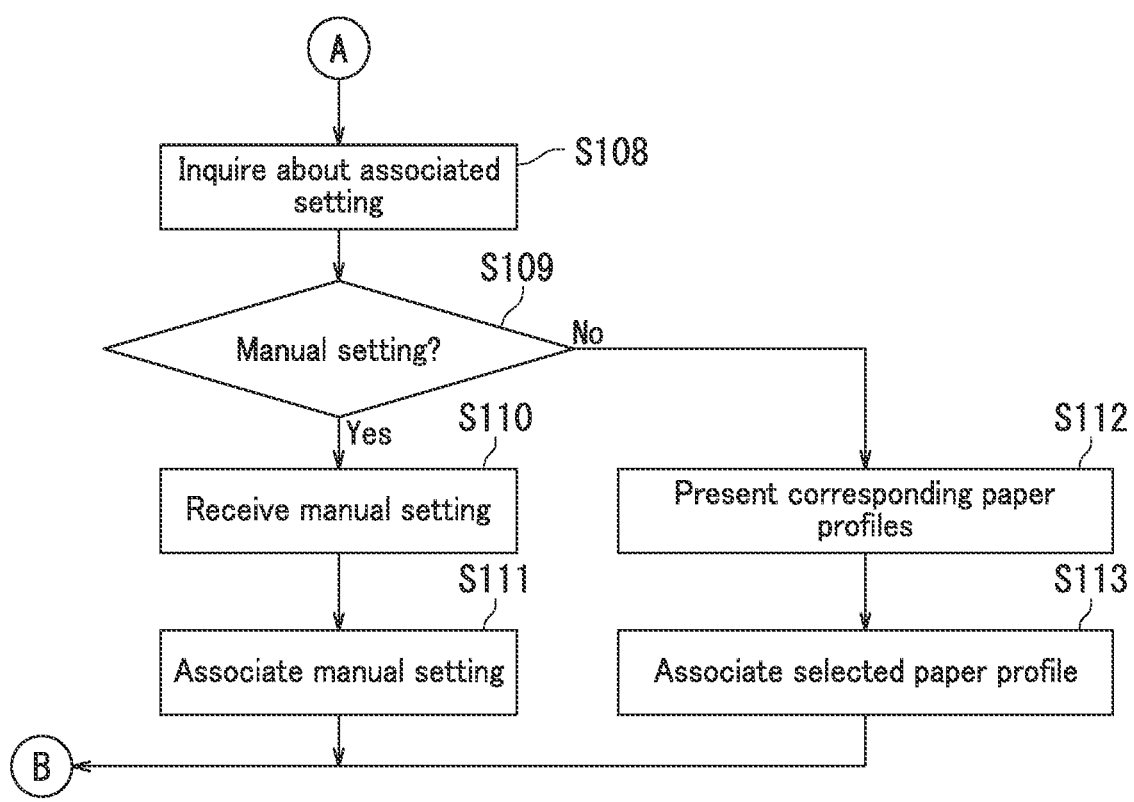
FIG. 3B is a second stage flowchart depicting the conformity confirmation operation of the image forming apparatus according to the embodiment of the present invention.

Next, the conformity confirmation operation performed by the paper feed stage setting section 11 is described in detail with reference to FIGS. 3A and 3B. Note that the conformity confirmation operation is performed for each paper feed stage. Accordingly, in the following description, the paper feed stages are not differentiated and recording paper tray 7, paper size sensor 71, open-close detection sensor 72, and paper class detection sensor 73 are used as generic terms.

Upon the open-close detection sensor 72 detecting opening or closing of a tray (Step S101), the paper size sensor 71 detects the paper size of the recording paper and the paper class detection sensors 73a to 73n detect the paper class of the recording paper (Step S102).

Next, the paper feed stage setting section 11 determines whether or not one paper profile is specifiable from the paper list 51 based on the detected paper size and the detected paper class of the recording paper (Step S103).

When specifiable in Step S103, the paper feed stage setting section 11 associates the recording paper tray 7 with a selected paper profile (Step S104) by updating the paper feed stage setting information 52 using the specified paper profile, and the conformity confirmation operation ends.

When not specifiable in Step S103, the paper feed stage setting section 11 determines whether or not the detected paper size and the detected paper class of the recording paper match a setting (paper profile or manual setting) for the recording paper in the paper feed stage setting information 52 (Step S105).

When the setting matches the detected ones in Step S105, the paper feed stage setting section 11 causes display of an inquiry screen on the operation section 4 to inquire with the user as to whether or not to change the setting (Step S106) and receives selection of whether or not to change (Step S107).

When selection of no change is received in Step S107, the paper feed stage setting section 11 ends the conformity confirmation operation with no change.

When the setting does not match the detected ones in Step S105 or selection of change is received in Step S107, the paper feed stage setting section 11 causes display of an inquiry screen on the operation section 4 to inquire whether to use a manual setting or a paper profile as an associated setting. The paper feed stage setting section 11 also inquires with the user about a target associated setting (Step S108). The paper feed stage setting section 11 further receives the target associated setting from the user (Step S109).

When a manual setting is received as the associated setting in Step S109, the paper feed stage setting section 11 receives the manual setting of an attribute value group manually set by the user (Step S110). By updating the paper feed stage setting information 52 using the received manual setting, the paper feed stage setting section 11 then associates the received manual setting with the recording paper tray 7 (Step S111) and the conformity confirmation operation ends.

When a paper profile is received as the associated setting in Step S109, the paper feed stage setting section 11 extracts paper profiles corresponding to the detected paper size and paper class by referring to the paper list 51. Further, the paper feed stage setting section 11 presents the extracted paper profiles to the user by causing display of a list on the operation section 4 (Step S112).

Next, the paper feed stage setting section 11 updates the paper feed stage setting information 52 using a paper profile selected by the user from the paper profiles displayed in the list on the operation section 4. The paper feed stage setting section 11 then associates the selected paper profile with the recording paper tray 7 (Step S113), and the conformity confirmation operation ends.

Note that in Step S111, when a mismatch is not resolved in the associated manual setting, the paper feed stage selecting section 12 may set the mismatched recording paper tray 7 as unusable (unselectable).

Figure 4A:
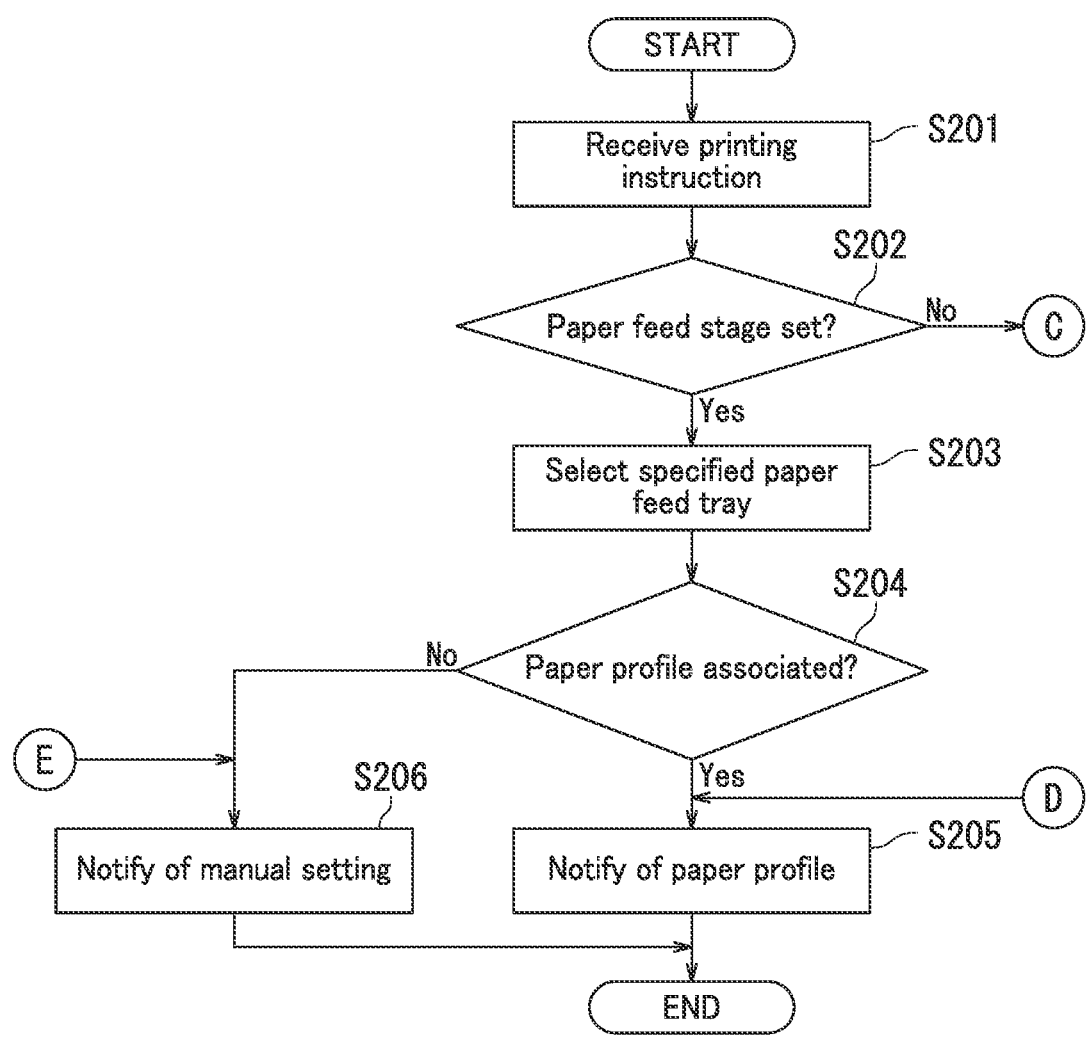
FIG. 4A is a first stage flowchart depicting a paper feed stage selection operation of the image forming apparatus according to the embodiment of the present invention.
Figure 4B:
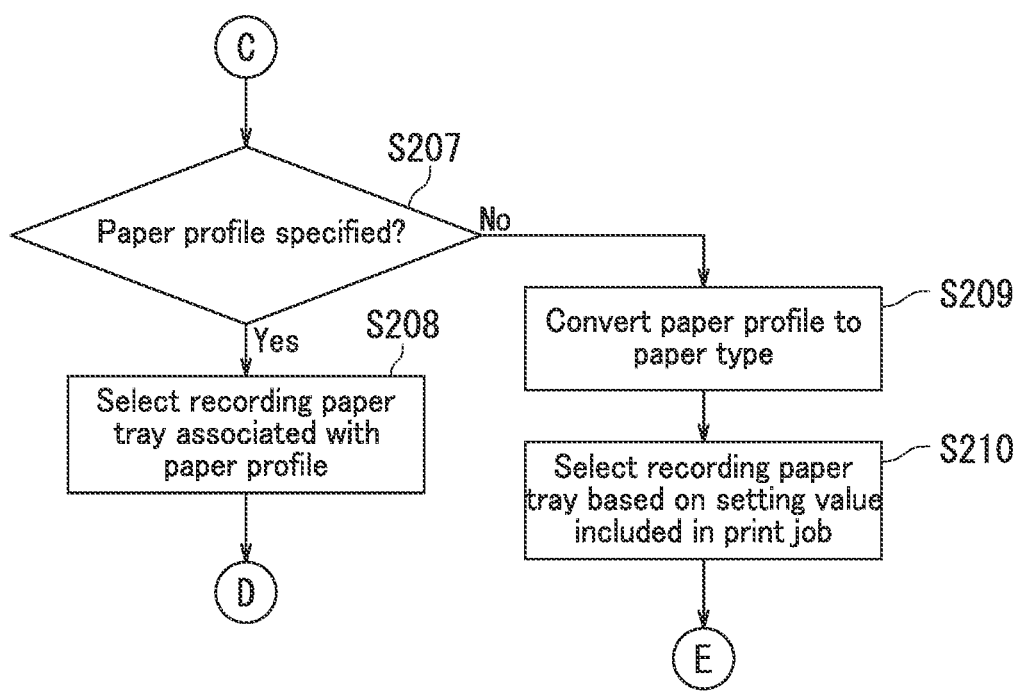
FIG. 4B is a second stage flowchart depicting the paper feed stage selection operation of the image forming apparatus according to the embodiment of the present invention.

Next, a paper feed stage selection operation performed by the paper feed stage selecting section 12 is described in detail with reference to FIGS. 4A and 4B.

Upon receiving a printing instruction (Step S201), the paper feed stage selecting section 12 determines whether or not the printing instruction specifies a paper feed stage (Step S202).

When the printing instruction specifies a paper feed stage in Step S202, the paper feed stage selecting section 12 selects the specified recording paper tray 7 (Step S203). Then, the paper feed stage selecting section 12 determines whether or not a paper profile is associated with the selected recording paper tray 7 by referring to the paper feed stage setting information 52 (Step S204).

When a paper profile is associated in Step S204, the paper feed stage selecting section 12 notifies the image forming section 6 of the associated paper profile (Step S205) and the paper feed stage selection operation ends. Therefore, the image forming section 6 can optimize printing conditions based on the attribute value group of the paper profile and perform advanced printing on the recording paper in the recording paper tray 7 selected in Step S203.

When a paper profile is not associated in Step S204, the paper feed stage selecting section 12 notifies the image forming section 6 of a manual setting (Step S206) and the paper feed stage selection operation ends. Therefore, the image forming section 6 can perform simple printing on the recording paper in the recording paper tray 7 selected in Step S203 under prescribed conditions based on the attribute value group of the manual setting.

When the printing instruction does not specify a paper feed stage in Step S202, the paper feed stage selecting section 12 determines whether or not the printing instruction is a printing instruction for advanced printing in which a paper profile is specified (Step S207).

When the printing instruction is a printing instruction for advanced printing in which a paper profile is specified in Step S207, the paper feed stage selecting section 12 selects a recording paper tray 7 associated with the specified paper profile (Step S208). Reaching Step S205, the paper feed stage selecting section 12 notifies the image forming section 6 of the associated paper profile.

When the printing instruction is not a printing instruction for advanced printing in which a paper profile is specified but rather a printing instruction for simple printing in Step S207, the type converting section 13 converts a paper profile associated with each recording paper tray 7a to 7n into a paper type for simple printing based on the type conversion table 53 (Step S209). Note that the type converting section 13 may convert a paper profile into a paper type for simple printing before setting of the paper profile.

The paper feed stage selecting section 12 then uses the paper type converted by the type converting section 13 to select a recording paper tray 7 corresponding to a setting value included in the print job from all of the recording paper trays 7a to 7n regardless of whether or not a paper profile is associated with any of the recording paper trays 7a to 7n (Step S210). Reaching Step S206, the paper feed stage selecting section 12 notifies the image forming section 6 of a manual setting.

As described above, the present embodiment is of an image forming apparatus 1 which performs advanced printing in which printing conditions are optimized for recording paper based on a paper profile. An attribute value group of the recording paper necessary for printing is collected in the paper profile. The image forming apparatus 1 includes an image forming section 6, a plurality of recording paper trays 7a to 7n, storage 5, and a paper feed stage selecting section 12. The image forming section 6 performs the advanced printing based on the paper profile. The recording paper trays 7a to 7n house recording paper to be fed to the image forming section 6. The storage 5 stores therein paper feed stage setting information 52 in which either a paper profile or a manual setting as an attribute value group manually set by a user is associated with each of the recording paper trays 7a to 7n. The paper feed stage selecting section 12 selects a recording paper tray 7 from the recording paper trays 7a to 7n from which the recording paper is to be fed to the image forming section 6 based on a printing instruction. By referring to the paper feed stage setting information, the paper feed stage selecting section 12 notifies the image forming section 6 of the specific paper profile associated with the selected recording paper tray 7 and causes the image forming section 6 to perform the advanced printing. When the specific paper profile is not associated with the selected recording paper tray 7, the paper feed stage selecting section 12 notifies the image forming section 6 of the manual setting and causes the image forming section 6 to perform simple printing.

Through this configuration, when a paper profile is not associated with the selected recording paper tray 7, simple printing with a manual setting can be performed. Accordingly, the image forming apparatus 1 is capable of both advanced printing based on paper profiles generally used in production printing and simple printing for offices.

Also according to the present embodiment, a type converting section 13 is included which converts the specific paper profile associated with a recording paper tray of the recording paper trays 7a to 7n into a paper type for simple printing. Upon receiving a printing instruction for the advanced printing in which a paper profile is specified, the paper feed stage selecting section 12 selects a recording paper tray 7 of the recording paper trays 7a to 7n that is associated with the specified paper profile, notifies the image forming section 6 of the associated paper profile, and causes the image forming section 6 to perform the advanced printing. Upon receiving a printing instruction for the simple printing, the paper feed stage selecting section 12 uses the paper type converted by the type converting section 13 to select a recording paper tray 7 corresponding to a setting value included in a print job from the recording paper trays 7a to 7n regardless of whether or not any paper profile is associated. The paper feed stage selecting section 12 then performs simple printing.

Through this configuration, recording paper appropriate to the printing instruction for simple printing can be selected from the recording paper trays 7a to 7n.

Also according to the present embodiment, the image forming apparatus 1 performs advanced printing in which printing conditions are optimized for recording paper based on a paper profile in which an attribute value group of the recording paper necessary for printing is collected. The image forming apparatus 1 includes an image forming section 6, a plurality of recording paper trays 7, storage 5, a paper sensor, an open-close detection sensor 72, and a paper feed stage setting section 11. The image forming section 6 performs the advanced printing based on the paper profile. The recording paper trays 7 house recording paper to be fed to the image forming section 6. The storage 5 stores therein paper feed stage setting information 52 in which a given paper profile is associated as the paper profile with one recording paper tray 7 of the recording paper trays 7. The paper sensor (paper size sensor 71, paper class detection sensor 73) detects information about the recording paper housed in each of the recording paper trays 7. The open-close detection sensor 72 detects an opening or closing operation of each of the recording paper trays 7. The paper feed stage setting section 11 provides a list of paper profiles including a paper profile corresponding to information about the recording paper detected by the paper sensor when the open-close detection sensor 72 detects the opening or closing operation of any of the recording paper trays 7 and the information (paper size, paper class) about the recording paper detected by the paper sensor does not match the paper feed stage setting information 52. The paper feed stage setting section 11 then updates the paper feed stage setting information 52 using a paper profile selected from the list.

Through this configuration, an appropriate paper profile can be associated with each recording paper tray 7 in a simple operation.

Furthermore, according to the present embodiment, the image forming apparatus 1 performs advanced printing in which printing conditions are optimized for recording paper based on a paper profile in which an attribute value group of the recording paper necessary for printing is collected. The image forming apparatus 1 includes an image forming section 6, a plurality of recording paper trays 7, storage 5, a paper sensor, an open-close detection sensor 72, and a paper feed stage setting section 11. The image forming section 6 performs advanced printing based on the paper profile. The recording paper trays 7 house recording paper to be fed to the image forming section 6. The storage 5 stores therein paper feed stage setting information 52 in which a given paper profile is associated with one recording paper tray 7 of the recording paper trays 7. The paper sensor (paper size sensor 71, paper class detection sensor 73) detects information about the recording paper housed in each of the recording paper trays 7. The open-close detection sensor 72 detects an opening or closing operation of each of the recording paper trays 7. When the open-close detection sensor 72 detects the opening or closing operation of a recording paper tray 7 of the recording paper trays 7, the paper feed stage setting section 11 updates the paper feed stage setting information 52 using a paper profile specified by the information about the recording paper in the recording paper tray detected by the paper sensor.

Through this configuration, an appropriate paper profile can be automatically associated with a corresponding recording paper tray 7.

Note that the present invention is not limited to the above embodiment. It is clear that the embodiment may be appropriately altered within a scope of the technical concept of the present invention.

The invention claimed is:

1. An image forming apparatus which performs advanced printing in which printing conditions are optimized according to a type of recording paper based on a paper profile as an attribute value group into which attribute values of recording paper necessary for printing are collected, the image forming apparatus comprising:
   an image forming section configured to perform the advanced printing based on the paper profile;
   a plurality of recording paper trays each of which houses recording paper to be fed to the image forming section;
   storage which stores therein paper feed stage setting information in which either a specific paper profile or a manual setting as an attribute value group manually set by a user is associated with each of the recording paper trays; and
   a paper feed stage selecting section configured to select a recording paper tray from the recording paper trays from which the recording paper is to be fed to the image forming section based on a printing instruction, wherein
   by referring to the paper feed stage setting information, the paper feed stage selecting section notifies the image forming section of the specific paper profile associated with the selected recording paper tray and causes the image forming section to perform the advanced printing, or notifies, when the specific paper profile is not associated with the selected recording paper tray, the image forming section of the manual setting and causes the image forming section to perform simple printing.

2. The image forming apparatus according to claim 1, further comprising
   a type converting section configured to convert the specific paper profile associated with a recording paper tray of the recording paper trays into a paper type for the simple printing, wherein
   upon receiving a printing instruction for the advanced printing in which a paper profile is specified, the paper feed stage selecting section selects a recording paper tray of the recording paper trays that is associated with the specified paper profile, notifies the image forming section of the associated paper profile, and causes the image forming section to perform the advanced printing, and
   upon receiving a printing instruction for the simple printing, the paper feed selecting section uses the paper type converted by the type converting section to select a recording paper tray corresponding to a setting value included in a print job from the recording paper trays and causes the image forming section to perform the simple printing regardless of whether or not any paper profile is associated.

3. The image forming apparatus according to claim 1, wherein
   a given paper profile is associated as the paper profile with one recording paper tray of the recording paper trays in the paper feed stage setting information, and
   the image forming apparatus further comprises:
   a paper sensor configured to detect information about the recording paper housed in each of the recording paper trays;
   an open-close detection sensor configured to detect an opening or closing operation of each of the recording paper trays; and
   a paper feed stage setting section which provides a list of paper profiles including a paper profile corresponding to information about the recording paper detected by the paper sensor and updates the paper feed stage setting information using a selected paper profile when the open-close detection sensor detects the opening or closing operation of any of the recording paper trays and the information about the recording paper detected by the paper sensor does not match the paper feed stage setting information.

4. The image forming apparatus according to claim 3, wherein
   the paper sensor is a paper size sensor which detects a paper size as the information about the recording paper housed in each of the recording paper trays.

5. The image forming apparatus according to claim 3, wherein
   the paper sensor is a paper class detection sensor which detects a paper class as the information about the recording paper housed in each of the recording paper trays.

6. The image forming apparatus according to claim 3, wherein
   the paper sensor includes:
   a paper size sensor which detects a paper size as the information about the recording paper housed in each of the recording paper trays; and
   a paper class detection sensor which detects a paper class as the information about the recording paper housed in each of the recording paper trays.

7. The image forming apparatus according to claim 3, wherein
   when the open-close detection sensor detects the opening or closing operation of a recording paper tray of the recording paper trays, the paper feed stage setting section updates the paper feed stage setting information using a paper profile specified by the information about the recording paper in the recording paper tray detected by the paper sensor.

8. The image forming apparatus according to claim 7, wherein
   the paper sensor is a paper size sensor which detects a paper size as the information about the recording paper housed in each of the recording paper trays.

9. The image forming apparatus according to claim 7, wherein
   the paper sensor is a paper class detection sensor which detects a paper class as the information about the recording paper housed in each of the recording paper trays.

10. The image forming apparatus according to claim 7, wherein
the paper sensor includes:
- a paper size sensor which detects a paper size as the information about the recording paper housed in each of the recording paper trays; and
- a paper class detection sensor which detects a paper class as the information about the recording paper housed in each of the recording paper trays.

* * * * *